3,206,542
COMPOSITE DIELECTRIC MATERIAL FOR WIRES AND CABLES
Leslie Norman Dawson, Cinderford, and Harold Roy Bennett, Gravesend, England, assignors to Associated Electrical Industries Limited, London, England, a British company
Filed Oct. 18, 1962, Ser. No. 231,564
Claims priority, application Great Britain, Nov. 17, 1961, 41,267/61
2 Claims. (Cl. 174—120)

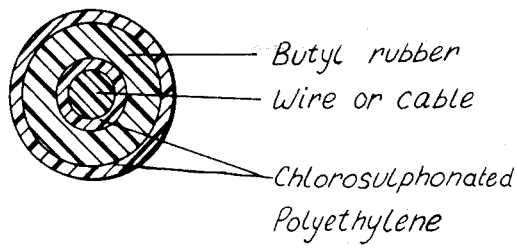

This invention is concerned with the preparation of a composite dielectric material which is to be used as a coating or sheath for electric wires and cables.

It has been customary to use butyl rubber as an insulating covering for electric mains cables; indeed, it is now a standard material for this purpose. Butyl rubber is a synthetic dielectric rubber capable of operating at 85° C. continuously. It is more resistant to ozone and moisture than most other elastomers, therefore it is used for high voltage cables where discharges could cause trouble. Because of its water resistance it is extensively used for cables buried underground without a metal sheath.

The dielectric resistance of butyl rubber is high, being similar to that of a higher volume natural rubber, whereas its permittivity is low, two admirable features for high voltage work. Unfortunately its fire resistance is poor, and so is its resistance to oils and solvents. Another disadvantage is that its tensile strength is low when compared with other elastomers. It must therefore be regarded as a soft dielectric which could be used with greater safety if it had some form of mechanical protection. Polychloroprene can be used as a sheath, but this material does not stand up well to high temperature working, so the butyl rubber cannot be used to full advantage.

Chlorosulphonated polyethylene is a synthetic elastomer with high mechanical strength and good heat resistance which has been utilised industrially in the form of conveyor belts. It can give continuous service at 100° C. without physical deterioration. The material is highly resistant to ozone, its fire resistance equals that of polychloroprene, and it is very resistant to oils, showing an improvement on the performance of polychloroprene when immersed in diesel oil. It has been found to be compatible with the impregnating varnishes used for electrical purposes and withstands the heat treatment of the varnishing processes.

The tensile strength of chlorosulphonated polyethylene is good and its abrasion resistance excellent. In addition to these mechanical characteristics, the texture of the material is such that it resists cutting by rough edges and is difficult to tear. This enables it to be pulled through orifices and into conduits without suffering appreciable damage.

By bonding butyl rubber with chlorosulphonated polyethylene to form a composite dielectric, a cable can be produced which is capable of operating successfully at 85° C. Such a cable, besides having an extremely tough outer covering, is resistant to ozone, fire, moisture, oil and solvents. By suitable selection of the butyl rubber and chlorosulphonated polyethylene compositions a good bond between the layers of the composite dielectric can be achieved, and this is important, as if a bond is not obtained then oils and solvents can penetrate the construction and attack the butyl rubber layer.

It can be said, therefore, that the use of butyl rubber as a heat resistant dielectric is well known but it suffers from the disadvantage of having relatively poor physical strength and poor abrasion resistance, being easily set on fire and not being resistant to oil. Chlorosulphonated polyethylene has excellent abrasion resistance, is oil resistant, heat resistant, corrosion resistant and flame retardant, but if used as a dielectric material has the disadvantage of having only a relatively low insulation resistance.

In accordance with the present invention, a conductor is insulated by a composite dielectric comprising an inner layer of vulcanised butyl rubber bonded to an outer layer of vulcanised chlorosulphonated polyethylene; or additionally the construction may include a layer of vulcanised chlorosulphonated polyethylene between the conductor and the butyl layer, the chlorosulphonated polyethylene layer being bonded to the butyl layer, the thickness of the chlorosulphonated polyethylene layer or layers being 30–50% of the whole. An insulated wire according to the invention is shown in cross section in the drawing wherein the insulation layers are each identified. Such a composite dielectric has good electrical properties, is heat resistant, oil resistant and flame retardant.

The individual layers of the dielectric are applied to the conductor in an unvulcanised or partially vulcanised form, so that during the final vulcanisation process the two or three layers bond together.

The following is typical of a butyl insulation composition suitable for this invention: All parts are by weight.

| | |
|---|---:|
| Butyl rubber | 100 |
| Calcined clay | 100–150 |
| Softener | 5– 10 |
| Zinc oxide | 5 |
| Promoter | 0.1– 1.0 |
| Vulcanising agent | 2– 6 |
| Sulphur | 0– 1 |
| Red lead | 0– 10 |
| Pigments | 0– 10 |

This butyl rubber can be applied to the conductor by an extrusion lapping or longitudinal covering process.

A typical chlorosulphonated polyethylene composition suitable for the present invention is as follows, all parts being by weight.

| | |
|---|---:|
| Chlorosulphonated polyethylene | 100 |
| China clay | 0–70 |
| Whiting | 0–70 |
| Carbon black | 0–20 |
| Softeners | 5–30 |
| Titanium dioxide | 0–30 |
| Magnesium oxide | 0–20 |
| Litharge | 0–20 |
| Accelerator | 0– 4 |
| Antioxidant | 0– 3 |
| Stabiliser | 0– 2 |
| Pigments | 0–10 |

This chlorosulphonated polyethylene can also be applied to the conductor by an extrusion, lapping or longitudinal covering process.

What we claim is:
1. An electrical element comprising at least one electrical conductor wire, surrounded by a composite dielectric sheath comprising an inner layer of vulcanized chlorosulphonated polyethylene, an intermediate layer of vulcanized butyl rubber bonded thereto, and an outer layer of vulcanized chlorosulphonated polyethylene bonded to said intermediate layer.

2. An electrical element as claimed in claim 1, in which the total thickness of chlorosulphonated polyethylene layers amounts to from 30% to 50% of the total thickness of the sheath.

References Cited by the Examiner

UNITED STATES PATENTS

| | | |
|---|---|---|
| 2,630,398 | 3/53 | Brooks et al. _____ 161—218 |
| 2,749,323 | 6/56 | Schaefer et al. |
| 2,854,425 | 9/58 | Boger et al. |
| 2,873,227 | 2/59 | Olson et al. |
| 2,939,904 | 6/60 | Ingmanson et al. _____ 117—218 |

FOREIGN PATENTS 517,065   1/40   Great Britain.

ALEXANDER WYMAN, *Primary Examiner.*

EARL M. BERGERT, *Examiner.*